(12) United States Patent
Brown

(10) Patent No.: US 11,848,544 B2
(45) Date of Patent: Dec. 19, 2023

(54) WIRE GRABBER

(71) Applicant: Terry Kevin Brown, Alabaster, AL (US)

(72) Inventor: Terry Kevin Brown, Alabaster, AL (US)

( * ) Notice: Subject to any disclaimer, the term of this patent is extended or adjusted under 35 U.S.C. 154(b) by 51 days.

(21) Appl. No.: 17/723,947

(22) Filed: Apr. 19, 2022

(65) Prior Publication Data

US 2022/0344915 A1     Oct. 27, 2022

Related U.S. Application Data

(60) Provisional application No. 63/178,605, filed on Apr. 23, 2021.

(51) Int. Cl.
*H02G 1/08*     (2006.01)
(52) U.S. Cl.
CPC ............. *H02G 1/081* (2013.01); *H02G 1/085* (2013.01)
(58) Field of Classification Search
CPC .......... H02G 1/00; H02G 1/08; H02G 1/088; H02G 1/1212
See application file for complete search history.

(56) References Cited

U.S. PATENT DOCUMENTS

| | | | | |
|---|---|---|---|---|
| 7,478,794 | B1 * | 1/2009 | Gohlke | B66C 1/42 254/134.3 R |
| 7,934,697 | B2 * | 5/2011 | Gohlke | B66C 1/42 254/134.3 R |
| 8,585,019 | B2 * | 11/2013 | Melsheimer | A61F 2/9526 254/134.3 R |
| 9,027,908 | B1 * | 5/2015 | Calhoun | F16G 11/048 254/134.3 R |
| 2012/0080650 | A1 * | 4/2012 | Davidson | H02G 1/081 29/525.08 |
| 2022/0344915 | A1 * | 10/2022 | Brown | H02G 1/085 |

* cited by examiner

*Primary Examiner* — Lee D Wilson
(74) *Attorney, Agent, or Firm* — H. Brock Kolls

(57) ABSTRACT

The present invention relates to a wire gripper to aid in wire pulling and method of use, A gripper is inserted into an interior cavity. A base comprises an interior cavity and a threaded attachment. The gripper comprises more than one flexible finger. A wire receptacle is formed between the flexible fingers. The gripper slides into the interior cavity of the base. A collar is open at both the top and bottom end. A wire passes through the top end of the collar and slides into the wire receptacle. The wire is retained within the wire receptacle by fastening the base to the collar causing the flexible finger to apply retaining pressure to the wire preventing the wire from being removed from the wire grabber. A pulling tension is applied by an installer person to the wire grabber to pull the wire from a starting location to a destination location.

13 Claims, 10 Drawing Sheets

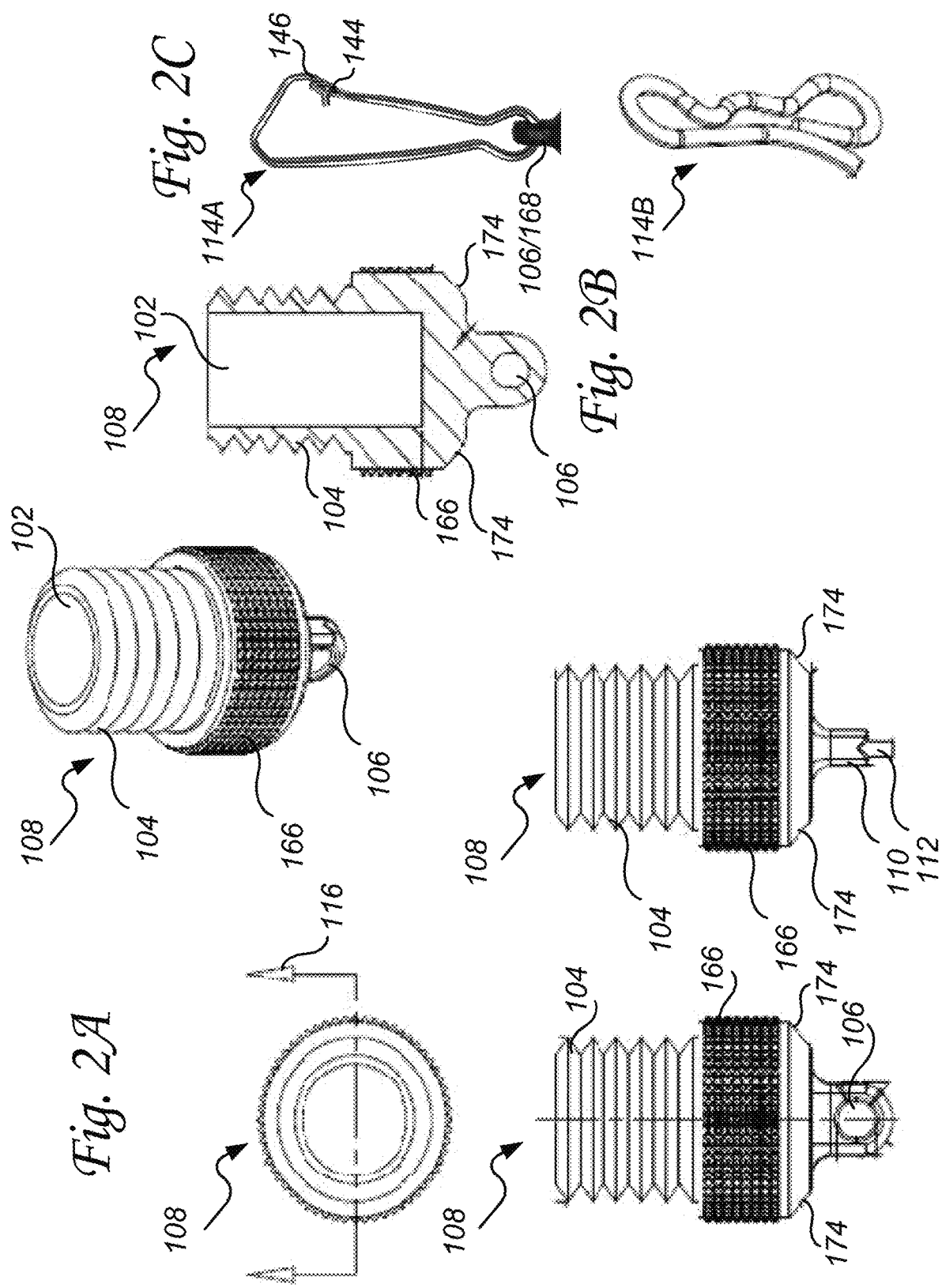

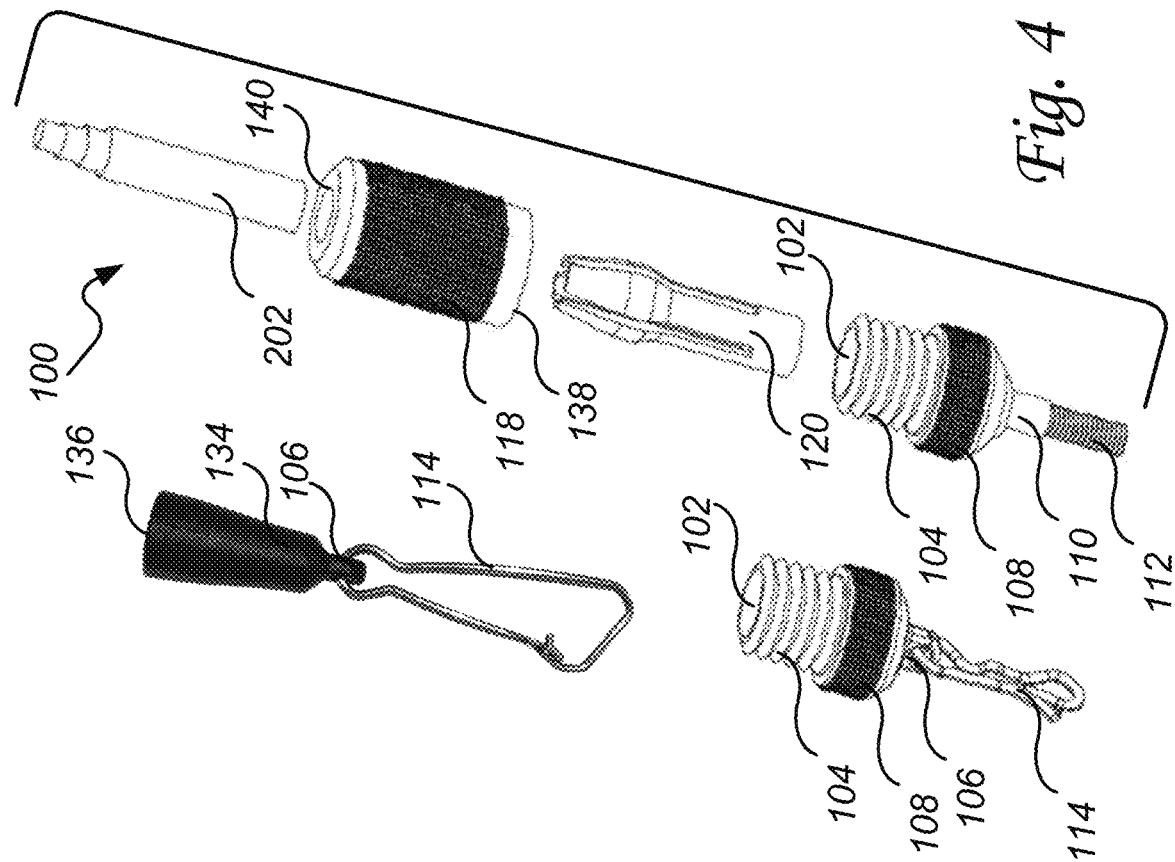
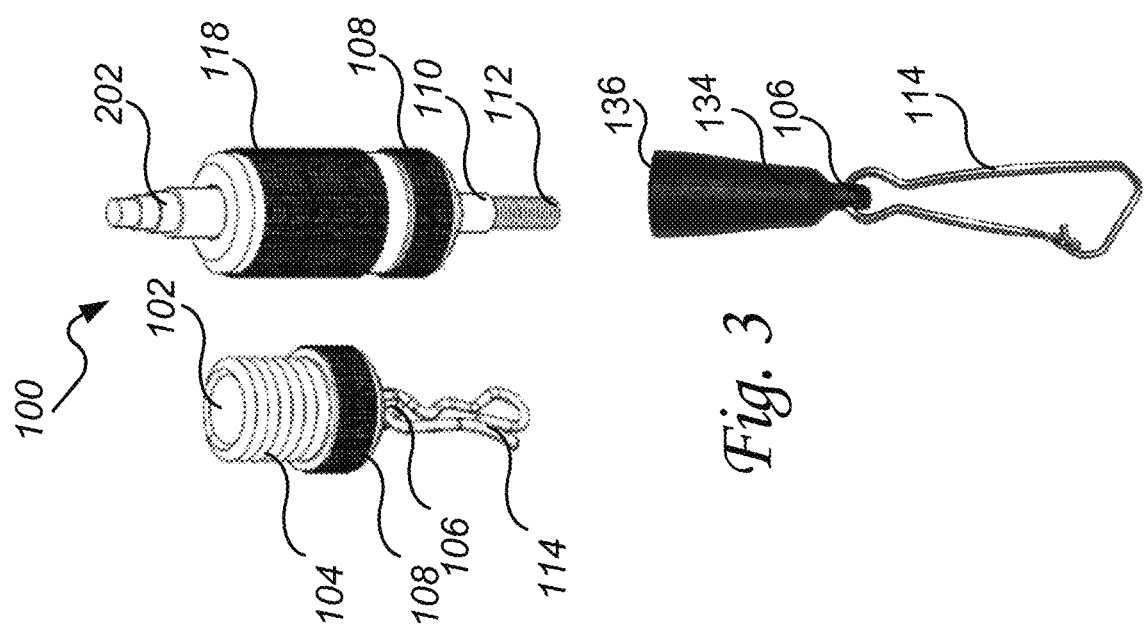

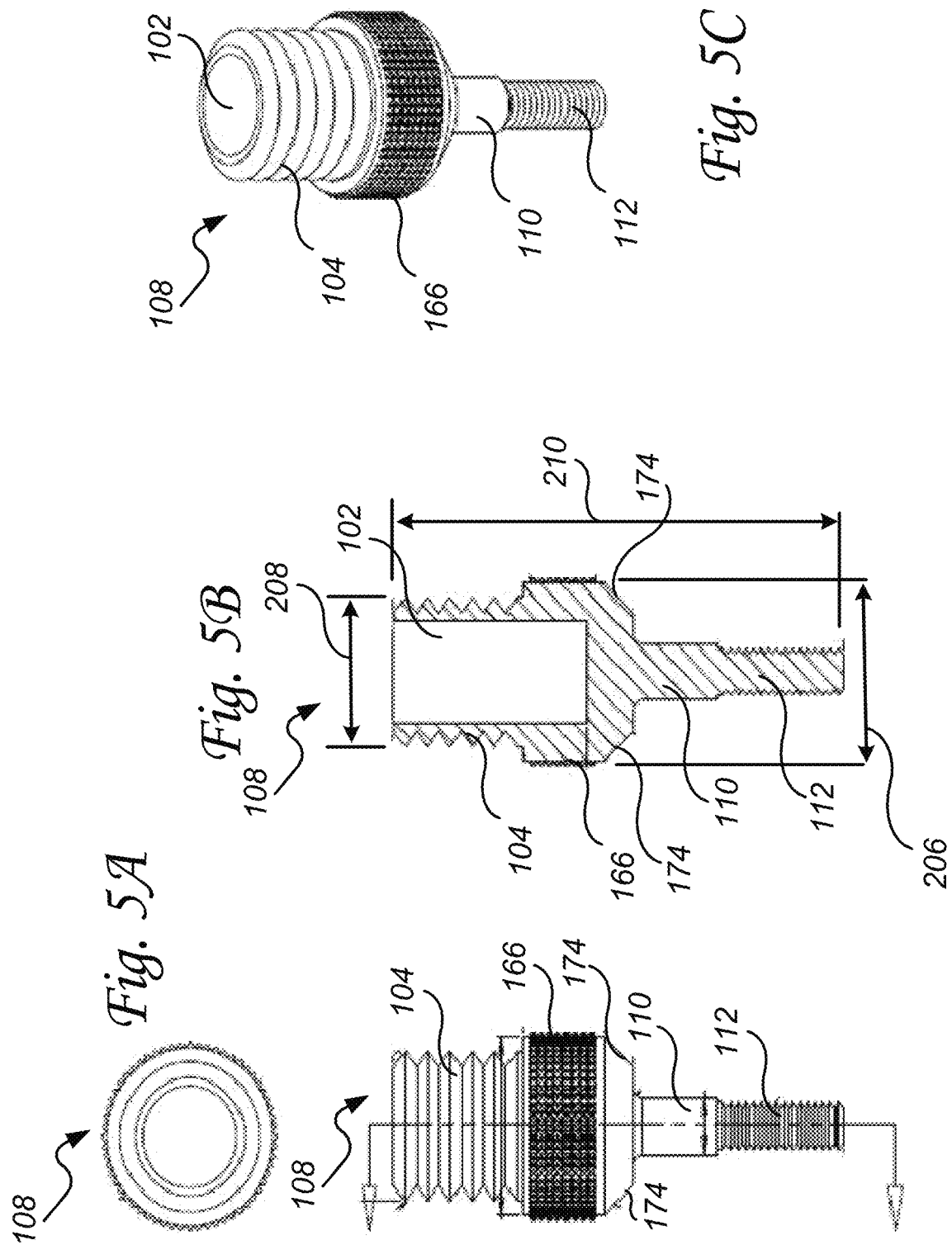

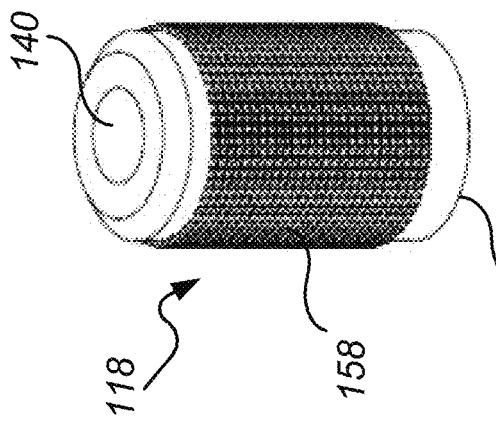
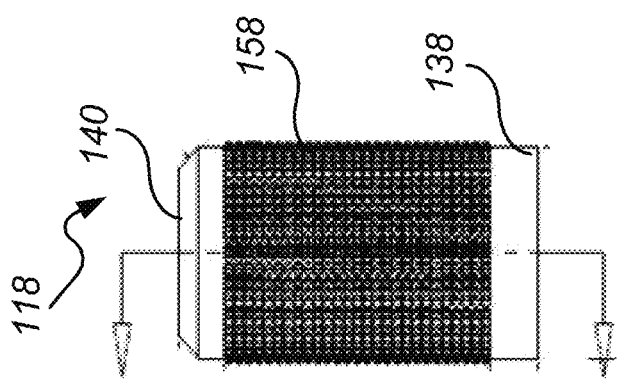
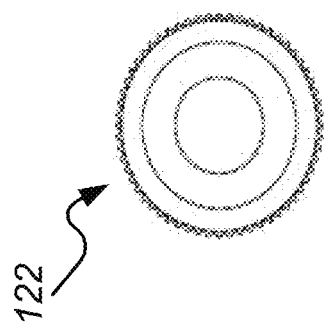

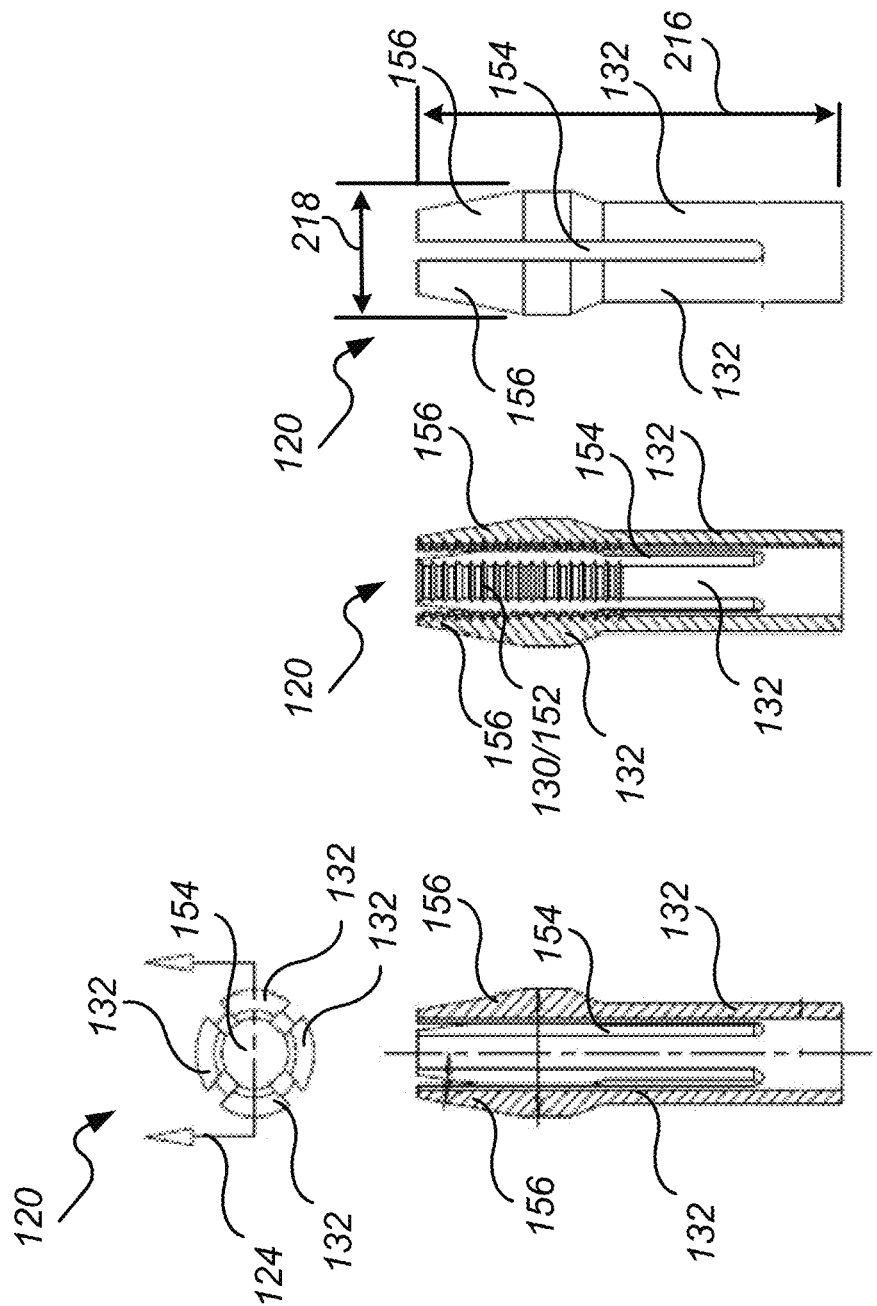

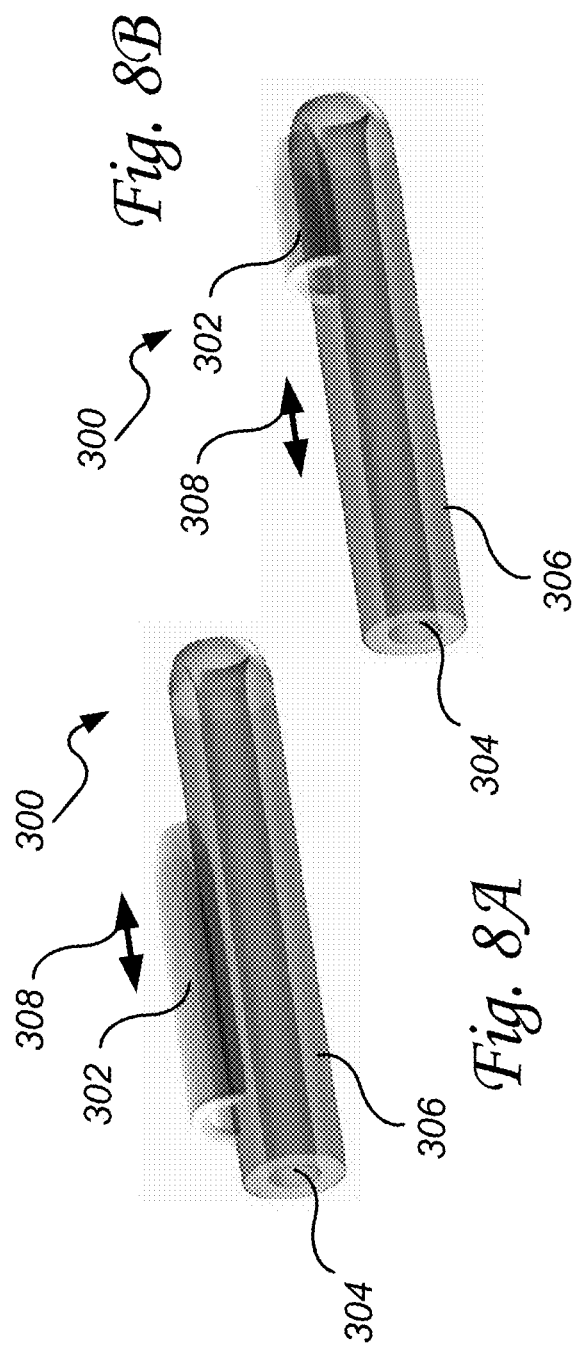
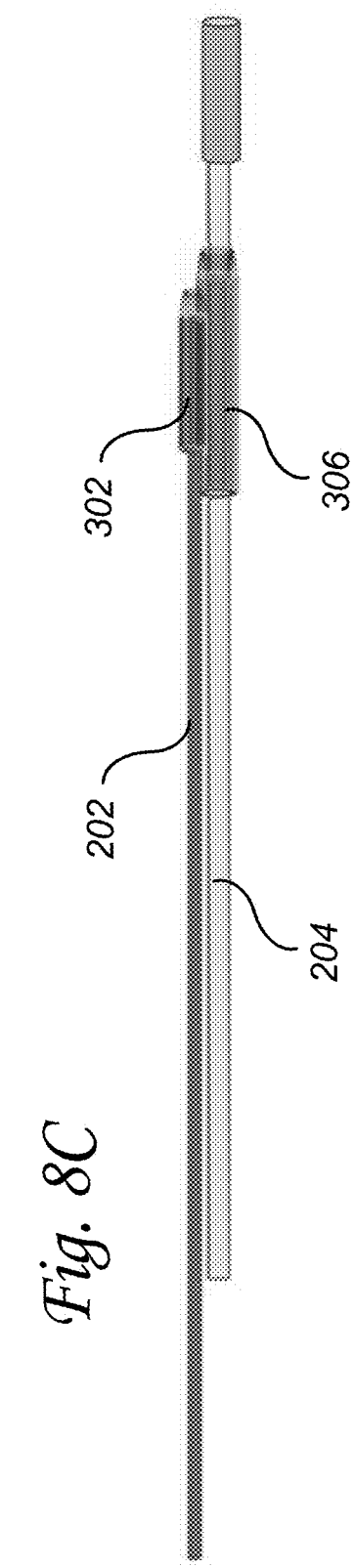

WIRE GRABBER

CROSS-REFERENCE TO RELATED APPLICATIONS

This application contains subject matter which is related to the subject matter of the following co-pending application. The below-listed application is hereby incorporated herein by reference in its entirety:

This is a U.S. non-provisional application that claims the benefit of a U.S. provisional application, Ser. No. 63/178,605, inventor Terry Kevin Brown, entitled "WIRE GRABBER", filed Apr. 23, 2021.

TECHNICAL FIELD OF THE INVENTION

This invention relates to a wire pulling device for use pulling wires through walls, drop tile ceilings, attics, crawl spaces, stud bays, conduit, or any other wire pulling activity, and particularly to a wire gripper and method of use. The wire gripper is removably attachable to a wire being pulled and designed to aid an installer person with the wire pulling activity.

BACKGROUND OF THE INVENTION

Before our invention installers installing wiring throughout homes, buildings and other places often wasted a lot of time and wire. In this regard, to install the wiring in a wall or other inaccessible space, an installer secures the loose end of a wire to a rod and pulls the wire through the inaccessible or unreachable areas. The loose end of the wire is often secured to the rod in preparation for pulling the wire by using a lot of tape. Once the wire pull is complete the installer then cuts the wire free from the rod wasting several inches or more of wire. The installer chooses to cut the wire free from the rod because it is faster than trying to remove the tape that is securing the wire. Wire routing can take many individual pull sequences to complete wire installation, each pull requiring the loose end of the wire to be taped to the rod, pulling the wire, and then cutting the wire free from the rod, wasting wire. An average pull length is in the 25-foot range which translates into 40 pulls per 1,000-foot roll of wire costing the installer in the range of $20 US or more per roll in cut lost wire.

Another shortcoming of the prior art is that while there are products that can be attached to a wire in an attempt to aid the pull process, these products damage the wire and/or require taping the wire to a rod prior to pulling the wire through an inaccessible space. Again, the damaged or taped wire is cut away after the pull is complete resulting in lost wire and a cost to the installer. On average, installers waste roughly three to five inches of wire on every pull.

The present invention addresses these and other shortcomings and provides other advantages by providing a reusable and removable wire grabber that can be affixed to the end of a wire. For these reasons and shortcomings as well as other reasons and shortcomings there is a long-felt need that gives rise to the present invention.

SUMMARY OF THE INVENTION

The shortcomings of the prior art are overcome and additional advantages are provided through the provision of a wire grabber to aid in wire pulling comprising a base that comprises an exterior base thread, an interior cavity, and a threaded attachment. A gripper comprises more than one flexible finger. The flexible finger comprises an exterior contoured edge and an interior finger surface that forms a wire receptacle between the flexible fingers. The gripper slides into the interior cavity of the base. And, a collar comprises a top end, a bottom end, a contoured interior wall proximate to the top end, and an interior collar thread proximate to the bottom end. The collar is open at both the top end and the bottom end. A wire passes through the top end of the collar and slides into the wire receptacle. The interior collar thread engages the exterior base thread removably fastening the base to the collar causing the contoured interior wall to engage the exterior contoured edge of the flexible finger causing the flexible finger to apply retaining pressure to the wire preventing the wire from being removed from the wire grabber. In this regard, by applying pulling tension to the threaded attachment the wire is pulled from a starting location to a destination location.

Additional shortcomings of the prior art are overcome and additional advantages are provided through the provision of a method of using a wire grabber to aid in wire pulling comprising the steps of inserting a gripper into an interior cavity. A base comprises an exterior base thread, the interior cavity, and a threaded attachment. The gripper comprises more than one flexible finger. The flexible finger comprises an exterior contoured edge and an interior finger surface that forms a wire receptacle between the flexible fingers. The gripper slides into the interior cavity of the base. A collar comprises a top end, a bottom end, a contoured interior wall proximate to the top end, and an interior collar thread proximate to the bottom end. The collar is open at both the top end and the bottom end.

The method continues by inserting a wire through the top end of the collar and sliding it into the wire receptacle. The wire is retained within the wire receptacle by engaging the interior collar thread with the exterior base thread removably fastening the base to the collar causing the contoured interior wall of the collar to engage the exterior contoured edge of the flexible finger causing the flexible finger to apply retaining pressure to the wire preventing the wire from being removed from the wire grabber. And a pulling tension is applied to the threaded attachment or the eyelet to pull the wire from a starting location to a destination location.

Additional shortcomings of the prior art are overcome and additional advantages are provided through the provision of a wire grabber to aid in wire pulling comprising a base that comprises an exterior base thread, an interior cavity, and an eyelet. A gripper comprises more than one flexible finger, the flexible finger comprises an exterior contoured edge and an interior finger surface that forms a wire receptacle between the flexible fingers. The gripper slides into the interior cavity of the base. And a collar comprises a top end, a bottom end, a contoured interior wall proximate to the top end, and an interior collar thread proximate to the bottom end. The collar is open at both the top end and the bottom end. A wire passes through the top end of the collar and slides into the wire receptacle. The interior collar thread engages the exterior base thread removably fastening the base to the collar causing the contoured interior wall to engage the exterior contoured edge of the flexible finger causing the flexible finger to apply retaining pressure to the wire preventing the wire from being removed from the wire grabber. In this regard, by applying pulling tension to the eyelet the wire is pulled from a starting location to a destination location.

Additional features and advantages are realized through the techniques of the present invention. Other embodiments and aspects of the invention are described in detail herein and are considered a part of the invention. For a better understanding of the invention with advantages and features, refer to the description and the drawings.

BRIEF DESCRIPTION OF THE FIGURES

The foregoing and other objects, features, and advantages of the invention are apparent from the following detailed description taken in conjunction with the accompanying drawings in which:

FIGS. 2A-2C illustrate one and a wire grabber base;

FIG. 3 illustrates three examples of attaching a wire grabber to a rod;

FIG. 4 illustrates one example of an assembly view of a wire grabber;

FIGS. 5A-5C illustrate one example of a wire grabber base comprising a threaded coupler for attachment to a rod;

FIGS. 6A-6C illustrate one example of a wire grabber collar;

FIGS. 7A-7C illustrates examples of a wire grabber gripper;

FIGS. 8A-8C illustrates one example of a wire grabber configured as a wire grabbing sleeve;

The detailed description explains the preferred embodiments of the invention, together with advantages and features, by way of example with reference to the drawings.

DETAILED DESCRIPTION OF THE INVENTION

Figure 1A:
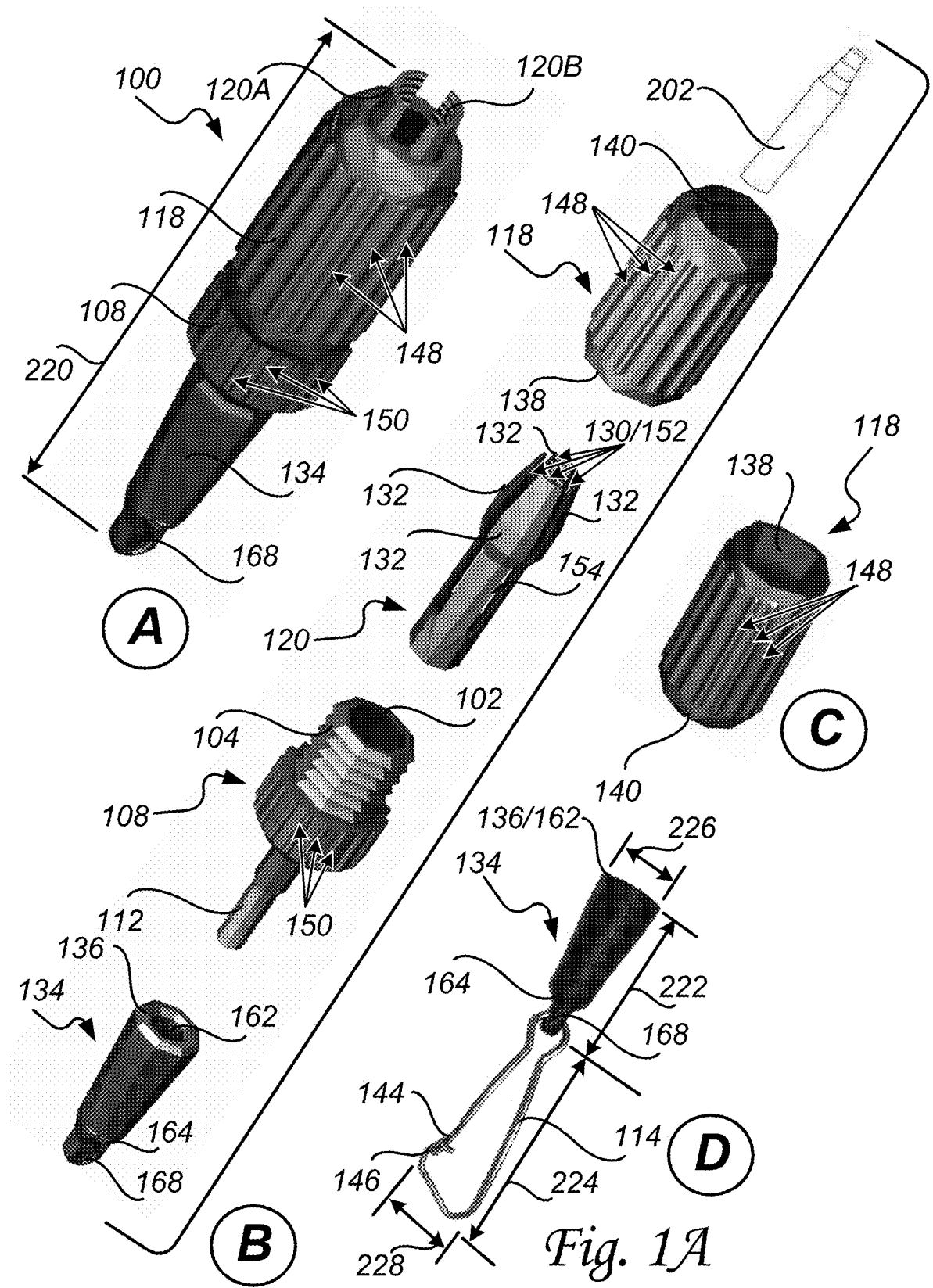
FIGS. 1A-1C illustrates one example of a wire grabber.

Turning now to the drawings in greater detail, it will be seen that in FIG. 1A there is illustrated one example of a wire grabber 100 to aid in wire pulling. In an exemplary embodiment reference 'A' illustrates the wire grabber 100 assembled, reference 'B' illustrates the wire grabber 100 disassembled, reference 'C' illustrates a bottom perspective view of the collar 118, and reference 'D' illustrates the pulling cap 134 with the clip 114 installed.

In operation, a base 108 comprises an exterior base thread 104, an interior cavity 102, and a threaded attachment 112. In an exemplary embodiment, the base 108 can comprise an exterior base finger grip 150/166. The exterior base finger grip 150/166 can be a textured surface of raised ridges 150, or knurled surface 166 as better illustrated in at least FIGS. 2A-B, or other types and/or kinds of textured surfaces, as may be required and or desired in a particular embodiment. The base 108 can be fabricated from a plastic, metal, a combination of plastic and metal, or other suitable materials as may be required and/or desired in a particular embodiment.

A gripper 120 comprises more than one flexible finger 132. Better illustrated in at least FIGS. 7A-C. The flexible fingers 132 comprise an exterior contoured edge 156, and an interior finger surface 152 that forms a wire receptacle 154 between each of the flexible fingers 132. The gripper 120 slides into the interior cavity 102 of the base 108. The gripper can be fabricated from a plastic, metal, a combination of plastic and metal, or other suitable materials as may be required and/or desired in a particular embodiment. In a plurality of exemplary embodiments, a gripper 120 can be designed with any number of flexible fingers 132. Typical configurations can include a three, or four flexible finger design.

A collar 118 comprises a top end 140, a bottom end 138, a contoured interior wall 142 proximate to the top end around the interior perimeter, as better illustrated in at least FIG. 6B, and an interior collar thread 160 proximate to the bottom end 138. The collar 118 is open at both the top end 140 and the bottom end 138. In an exemplary embodiment, the collar 118 can comprise an exterior collar finger grip 148/158. The exterior collar finger grip 148 can be a textured surface of raised ridges 148, a knurled surface 158 as better illustrated in at least FIGS. 6A-C, or other textured surfaces, as may be required and/or desired in a particular embodiment. The collar 118 can be fabricated from a plastic, metal, a combination of plastic and metal, or other suitable materials as may be required and/or desired in a particular embodiment.

In an exemplary embodiment, a wire 202 passes through the top end 140 of the collar 118 and slides into the wire receptacle 154. The interior collar thread 160 engages the exterior base thread 104 removably fastening the base 108 to the collar 118 causing the contoured interior wall 142 to engage the exterior contoured edge 156 of the flexible fingers 132 causing the flexible fingers 132 to apply retaining pressure to the wire 202 preventing the wire 202 from being removed from the wire grabber 100.

In an exemplary embodiment, by applying a pulling tension to the threaded attachment 112 the wire 202 can be pulled from a starting location to a destination location. Such pulling tension can be applied by way of a rod 204 that is screwed onto the threaded attachment 112 and pulled by an installer person often through walls, drop tile ceilings, attics, crawl spaces, stud bays, conduit, or any other wire pulling activity.

Alternatively, such pulling tension can be applied by way of a pulling cap 134 that comprises a top pulling cap end 136 that is open, a bottom pulling cap end 164, an interior pulling cap thread 162 along the interior surface of the top pulling cap end 136, and a pulling cap eyelet 168 on the exterior surface of the pulling cap 134 proximate the bottom pulling cap end 164. The pulling cap 132 by way of the pulling cap thread 162 is removably fastened to the threaded attachment 112. The pulling cap 134 can be fabricated from a plastic, metal, a combination of plastic and metal, or other suitable materials as may be required and/or desired in a particular embodiment.

In an exemplary embodiment, the threaded attachment 112 can be positioned on the exterior surface of the base 118 colinear with the wire receptacle 154 when the gripper 120 slides into the interior cavity 102 of the base 108. In this regard, when the wire 202 is slid into the wire receptacle 154 the threaded attachment 112 is colinear with the wire 202 such that the when a pulling tension is applied to the threaded attachment 112 the pulling tension is applied along the length of the wire gripper 100 and gripped wire 202 in a colinear manner.

In an exemplary embodiment, a clip 114 can be removably connected to the pulling cap eyelet 168 or the eyelet 106. The clip comprises a locking ring end 144, and a bent clip end 146. The locking ring end 144 mates with a bent clip end 146 increasing the amount of pulling tension force the clip 114 supports. In operation, a rod 204, cord, or other pulling objects can be interconnected to clip 114. The wire grabber 100 and gripped wire 202 can then be pulled by way of clip 114 from a starting location to a destination location.

Figure 1B:
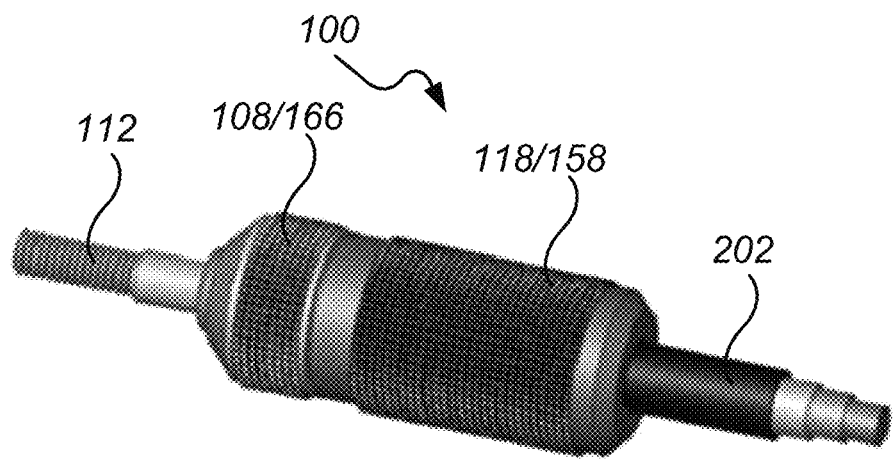

Referring to FIG. 1B there illustrated one example of a wire grabber 100 assembled with a knurled surface texture 158/166 on the base 108 and collar 118.

Figure 1C:
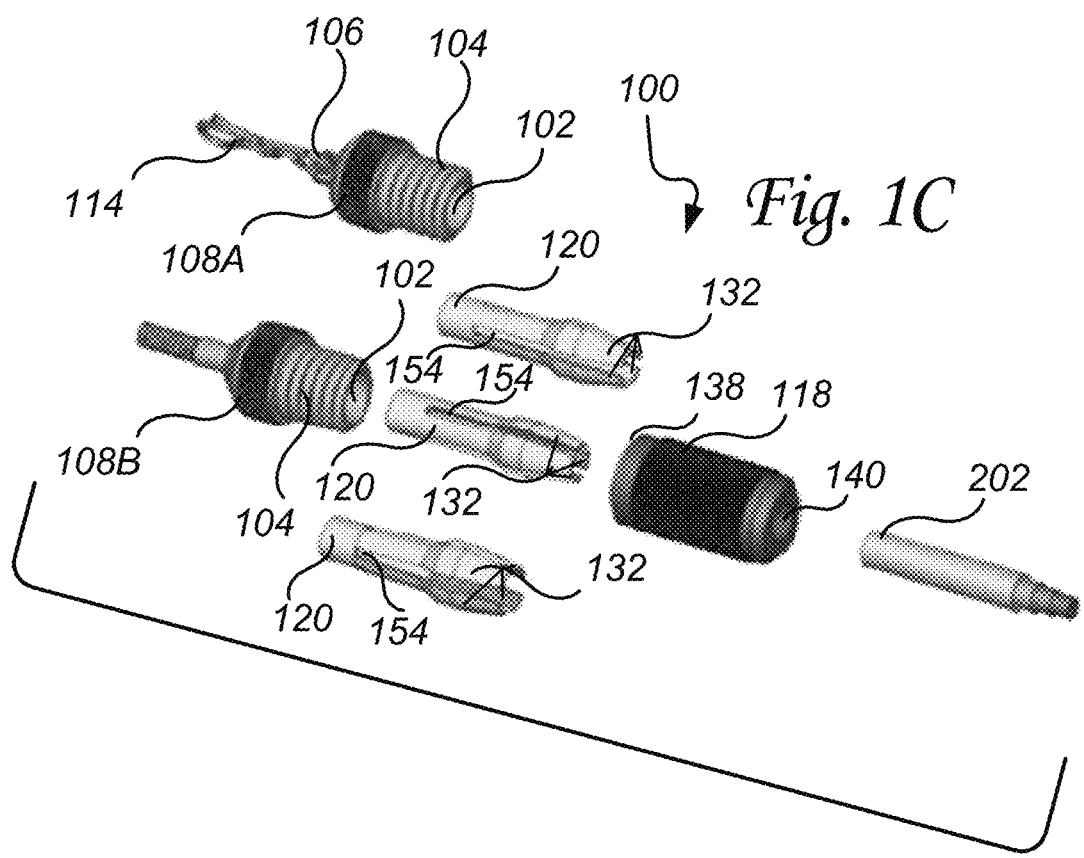

Referring to FIG. 1C there is illustrated a disassembled view of the wire grabber 100. In an exemplary embodiment, a base 108A-B comprises an exterior base thread 104, an interior cavity 102, and an eyelet 106 on base 108A or a threaded attachment 112 on base 108B. A gripper 120 comprises more than one flexible finger 132. The flexible finger 132 comprises an exterior contoured edge 156, and an interior finger surface 152 better illustrated in at least FIGS. 7A-C that forms a wire receptacle 154 between the flexible fingers 132. The gripper 120 slides into the interior cavity 102 of the base 108A-B.

A collar 118 comprises a top end 140, a bottom end 138, a contoured interior wall 142 proximate to the top end 140, and an interior collar thread 160 proximate to the bottom end which is better illustrated in FIG. 6B. The collar 118 is open at both the top end 140 and the bottom end 138. A wire 202 passes through the top end 140 of the collar 118 and slides into the wire receptacle 154. The interior collar thread 160 engages the exterior base thread 104 removably fastening the base 108 to the collar 118 causing the contoured interior wall 142 to engage the exterior contoured edge 156 of the flexible finger causing the flexible finger 132 to apply retaining pressure to the wire 202 preventing the wire 202 from being removed from the wire grabber 100. In this regard, by applying pulling tension to the eyelet 106 the wire 202 is pulled from a starting location to a destination location.

The base 108A can have a clip 114 attached to the eyelet 106 for receiving a rod 204, cord, or other pulling tension sources that can be connected to the clip 114. Also shown in FIG. 1C is gripper 120 are several grippers 120 of different sizes and configurations to accommodate different gauge wires 202. In this regard, the gripper 120 size can be selected based, in part, on the gauge of the wire being pulled including the wire receptacle 154, length and/or thickness of the flexible fingers 132, whether or whether not there are gripping teeth 130 integrally formed onto each of the interior finger surfaces 154 of the flexible fingers 132, and other factors as may be required and/or desired in a particular embodiment. In an exemplary embodiment, the wire grabber 100 and the various parts including the collar 118, gripper 120, the base 108, clip 114, and other parts can be manufactured from metal, plastic, a combination thereof, or manufactured from other materials, as may be required and/or desired in a particular embodiment.

In an exemplary embodiment, the flexible fingers 132 comprise gripping teeth 130 along the interior finger surface 152. In this regard, the gripping teeth 130 engage the wire 202 outer coating when the base 108 is removably fastened to the collar 118 minimizing slipping of the wire 202 from the wire receptacle 154 when a pulling tension is applied to the wire 202.

In an exemplary embodiment, in reference 'A', the assembled wire gripper 100 can be in the range of 50 millimeters (mm) to 100 mm in length 220, preferably in the range of 60 mm to 90 mm in length 220, and ideally in the range of 70 mm in length 220.

In an exemplary embodiment, in reference 'D', pulling cap 134 can be in the range of 15 mm to 60 mm in length 222, preferably in the range of 20 mm to 40 mm in length 222, and ideally in the range of 27 mm in length 222. In an exemplary embodiment, pulling cap 134 can be in the range of 5 mm to 30 mm in width 224, preferably in the range of 8 mm to 20 mm in width 224, and ideally in the range of 10 mm in width 224. In an exemplary embodiment, clip 114 can be in the range of 20 mm to 60 mm in length 226, preferably in the range of 30 mm to 50 mm in length 226, and ideally in the range of 42 mm in length 226. In an exemplary embodiment, clip 114 can be in the range of 8 mm to 30 mm in width 228, preferably in the range of 10 mm to 20 mm in width 228, and ideally in the range of 13 mm in width 228.

Referring to FIG. 2A-2C there is illustrated one example of wire grabber 100, base 108. With reference to FIG. 2A, in an exemplary embodiment, the base 108 comprises an exterior base thread 104 for receiving a collar 118 having interior collar thread 160, and either a clip 114 attachment eyelet 106, or a threaded attachment 112 for securing the wire grabber 100 to a threaded rod 204 or pulling cap 134. The base 108 can be knurled 166 or ridge 150 to provide grip for the installer person to tighten and loosen the base 108 to and from the collar 118. The collar 118 can also be knurled 158 or ridge 148 to promote grip. The interior cavity 102 of the wire grabber 100 is hollow and configured to receive a gripper 120. 116 indicates a top view of the base 108. The base 108 can have a chamfered edge 174 proximate the eyelet 106 or threaded attachment 112, connecting portion 110.

FIG. 2B is a cross-sectional view of the base 108 illustrating the exterior base thread 104, eyelet 106, and an interior cavity 102. FIG. 2C illustrates two clips 114A-B of different styles that can pass through the eyelet 106 or pulling cap eyelet 168 and further connect to a rod 204, cord, or other pulling tension source to effectuate wire 202 pulling.

In an exemplary embodiment, a clip 114A can be removably connected to the eyelet 106/168. The clip 114A can comprise a locking ring end 144, and a bent clip end 146. The locking ring end 144 mates with a bent clip end 146 increasing the amount of pulling tension force the clip 114A supports by joining the loose ends of the clip 114A. Clip 114B can be a folded clip design absent any interlocking ends, instead relying on the proximity of the folded edges to mitigate slipping loose from the eyelet 106/168 unless aided by the installer person. Both clips 114A-B can be manufactured from metal and can be sized to support a desired pulling tension force load, as may be required and/or desired in a particular embodiment.

Referring to FIG. 3, there is illustrated three examples of attaching a wire grabber 100 to a rod 204. In an exemplary embodiment, in one example a base 108 comprising an eyelet 106 can have a clip 114 passed through the eyelet 106 and the clip 114 further attached to a rod 204, cord, or other pulling sources to effectuate pulling the wire 202. In another exemplary embodiment, a threaded attachment 112 can be configured to receive a threaded rod 204 to effectuate the pulling of the wire 202. In another exemplary embodiment, a pulling cap 134 can be screwed onto the threaded attachment 112, the pulling cap comprising a pulling cap eyelet 168. A clip 114 can be passed through the pulling cap eyelet 168, and clip 114 can further be attached to a rod 204, cord, or other pulling sources to effectuate pulling the wire 202.

Referring to FIG. 4, there is illustrated one example of an assembly view of a wire grabber 100. In an exemplary embodiment, in operation, the installer person inserts a gripper 120 into the base 108. A wire 202 to be pulled is passed through the top end 140 of the collar 118 and inserted into a wire receptacle 154 that is formed between the flexible fingers 132 of the gripper 120. The gripper is slid into the interior cavity 102 of the base 108. The collar 118 is screwed onto the base 108 by way of the exterior base threads 104 and the interior collar threads 160 constricting the gripper 120 around the wire 202. The installer person can then either use the rod 204, a clip 114, or a pulling cap 132 on the base 108. In this regard, applying a pulling force to the wire gripper 100 and the wire 202 held with the wire gripper 100 by way of a clip 114 attached to the eyelet 106 or pulling cap eyelet 168 and puller by a rod 204, cord, or other sources, or by way of a threaded rod screwed to or otherwise attached to the threaded attachment 112. Once the wire grabber 100 is secured to wire 202 and rod 204, cord, or other sources, the wire 202 can be pulled from a start location to a destination location often through walls, drop tile ceilings, attics, crawl spaces, stud bays, conduit or any other wire pulling activity as required and/or desired by the installer person.

Referring to FIG. 5, there is illustrated one example of a wire grabber base 108 comprising a threaded attachment 112 to a rod 204 or pulling cap 134. In an exemplary embodiment, the base 108 can comprise an exterior base thread 104 upper portion for receiving a collar 118 having interior collar threads 160, and either a threaded attachment 112. The threaded attachment 112 effectuates the ability to secure the base 108 to a threaded rod 204, or a securing cap 134. The base 108 can be knurled 166 or ridge 150 to provide grip for the installer person to tighten and loosen the base 108 to and from the collar 118. The collar 118 can also be knurled 166 or ridge 150 to promote grip. The interior cavity 102 of the wire grabber 100 is hollow and configured to receive a gripper 120. 116 indicates a top view of the base 108. The base 108 can have a chamfered edge 174 edge proximate the eyelet 106 or threaded attachment 112, connecting portion 110.

In an exemplary embodiment, the threaded attachment can have a thicker diameter upper connecting portion 110 where it is joined to the bottom side of the base 108. The thicker in diameter portion improves the pulling strength (without breaking) by preventing the threaded attachment 112 from bending when brute force is applied to the wire gripper 100 during wire 204 pulling by an installer person. Absent the upper connecting portion 110, such brute force could cause the threaded attachment 112 to bend or break at the connection point between the bottom of the base 108 and the threaded portion of the threaded attachment 112.

FIG. 5B is a cross-sectional view of the base 108 illustrating the exterior base threads 104, the threaded attachment 112 for receiving a threaded rod 204 or pulling cap 134, the interior cavity 102, and chamfered edge 174 proximate the eyelet 106 or threaded attachment 112, connecting portion 110.

In an exemplary embodiment, base 108 can be in the range of 12 mm to 30 mm in width 206, preferably in the range of 14 mm to 25 mm in width 206, and ideally in the range of 16 mm in width 206. In an exemplary embodiment, the exterior base thread 104 portions of the base 108 can be in the range of 10 mm to 16 mm in width 208, preferably in the range of 10 mm to 14 mm in width 208, and ideally in the range of 12 mm in width 208. In an exemplary embodiment, the length of the base 108 inclusive of the threaded attachment 112 can be in the range of 30 mm to 60 mm in length 210, preferably in the range of 35 mm to 50 mm in length 210, and ideally in the range of 41 mm in length 210.

FIG. 5C illustrates a threaded rod 204 or pulling cap 134 attachment to the threaded attachment 112 to effectuate wire 204 pulling.

Referring to FIGS. 6A-6C, there is illustrated one example of a wire grabber 100, collar 118. With reference to FIG. 6A, in an exemplary embodiment, collar 118 can be knurled 158, ridges 148, or have other textures to promote the installer person's grip during use. The collar 118 is hollow and comprises a top end 140 and a bottom end 138 both the top end 140 and bottom end 138 are open. A wire 202 can be passed through top end 140 and fitted into the gripper 120 wire receptacle 154 area. The interior walls of the collar 118 are tapered having a contoured interior wall 142 such that as collar 118 is screwed onto the base 108 the contoured interior walls 142 engage the gripper 120 exterior contoured edge 156 creating equally distributed force around the circumference of the gripper 120 causing the gripper 120 to constrict around and securely hold the wire 202. 122 in FIG. 6A is a top view of the collar 118.

FIG. 6B is a cross-sectional view of the collar 118 illustrating the contoured interior walls 142 which are configured to engage and apply equal pressure around the circumference of the gripper 120 exterior contoured edge 156 when the collar 118 is screwed onto the base 108. Also illustrated in FIG. 6B is the interior collar thread 160 and a relief contour 172. The relief contour 172 sets on the top of the base 108 aligned with and proximate to the chamfered edge 174 when the collar 118 is screwed all the onto the base 108 allowing the collar 118 to form a tight secure fit with the base 108.

In an exemplary embodiment, the collar 118 can be in the range of 20 mm to 60 mm in length 212, preferably in the range of 35 mm to 50 mm in length 212, and ideally in the range of 34 mm in length 212. In an exemplary embodiment, the collar 118 can be in the range of 10 mm to 30 mm in width 214, preferably in the range of 12 mm to 20 mm in width 214, and ideally in the range of 16 mm in width 214.

FIG. 6C is a perspective view of collar 118 illustrating the top end 140 having a hole therethrough which the wire 202 passes and is received into the gripper 120 wire receptacle 154.

Referring to FIGS. 7A-7C, there are illustrated examples of a wire grabber 100 grippers 120. Referring to FIG. 7A, in an exemplary embodiment gripper 120 comprises a plurality of flexible fingers 132. An interior finger surface 152 forms a wire receptacle 154 between the flexible fingers 132. A wire can be inserted into the wire receptacle 154. The gripper 120 can be of different sizes to accommodate different gauge wires and support different maximum wire retention pulling tension forces. 124 is a reference to a top view of the gripper 120.

In operation, pressure on the exterior contoured edge 156 of the fingers 132 from the collar 118 contoured interior wall 142 as it is threaded onto the base 108 causes the flexible fingers 132 to flex inward towards the wire 204 applying force and retaining in the gripper 120 the inserted wire 202.

FIG. 7B illustrates a sectional view of gripper 120 in an exemplary embodiment, gripping teeth 130 can be integrally formed onto the interior finger surfaces 154 of the flexible fingers 132. The flexible fingers 132, in an exemplary embodiment, have gripping teeth 130 along the interior finger surface 152 bites into the wire casing slightly to better retain a constricted wire by friction.

FIG. 7C illustrates an external view of gripper 120. In an exemplary embodiment, the gripper 120 can be in the range of 20 mm to 60 mm in length 216, preferably in the range of 35 mm to 50 mm in length 216, and ideally in the range of 34 mm in length 216. In an exemplary embodiment, the gripper 120 can be in the range of 5 mm to 20 mm in width 218, preferably in the range of 7 mm to 15 mm in width 218, and ideally in the range of 9 mm in width 218.

In a plurality of exemplary embodiments, a gripper 120 can be designed with any number of flexible fingers 132. Typical configurations can include a three, or four flexible finger design.

In operation, the flexible finger 132 comprises gripping teeth 130 along the interior finger surface 152, wherein the gripping teeth 130 engage the wire 202 when the base 108 is removably fastened to the collar 118 minimizing slipping of the wire 202 from the wire receptacle 154 when a pulling tension is applied to the wire 202.

In an exemplary embodiment, various size and diameter grippers 120 can be used to accommodate different sizes and gauge wire 202. In this regard, using a gripper 120 with too small a diameter can cause the wire 202 to not fit into the gripper 120 or when gripped apply too much force causing damage to the wire 202 casing and/or wire itself. Using too large a diameter gripper 120 will cause too little constricting force being applied to the wire 202 and as such the wire 202 may pull free from the gripper 120 under load.

Referring to FIGS. 8A-8C there is illustrated one example of a wire grabber configured as a wire grabbing sleeve 300. In an exemplary embodiment, referring to FIG. 8C the wire grabbing sleeve 300 can be configured to slide over and be secured to a rod 204. In this regard, a sleeve 306 comprises a rod aperture 304 through which a rod 204 can be inserted. The wire grabbing sleeve 300 can be positioned on rod 204 and secured in place. The wire grabbing sleeve 300 also comprises a wire grabbing port 302. In operation, the grabbing port can be slid 308 to a first open position FIG. 8B along the sleeve 306 and a wire 202 can be inserted into the wire grabbing port 302. The wire grabbing port 302 can then be slid 308 to a second position FIG. 8A along the sleeve 306 causing the wire 202 to be gripped by gripper 120 and/or by other means, as may be required and/or desired in a particular embodiment.

Figure 9:
FIG. 9 illustrates one example of a packaging information card.

Referring to FIG. 9 there is illustrated one example of a packaging information card 402. In an exemplary embodiment, the wire gripper 100 can be packaged with the packaging information 402. Such packaging information can provide instructions for use and references to online resources where an installer person and others can obtain information and order wire gripper 100 products.

Figures 10, 11:
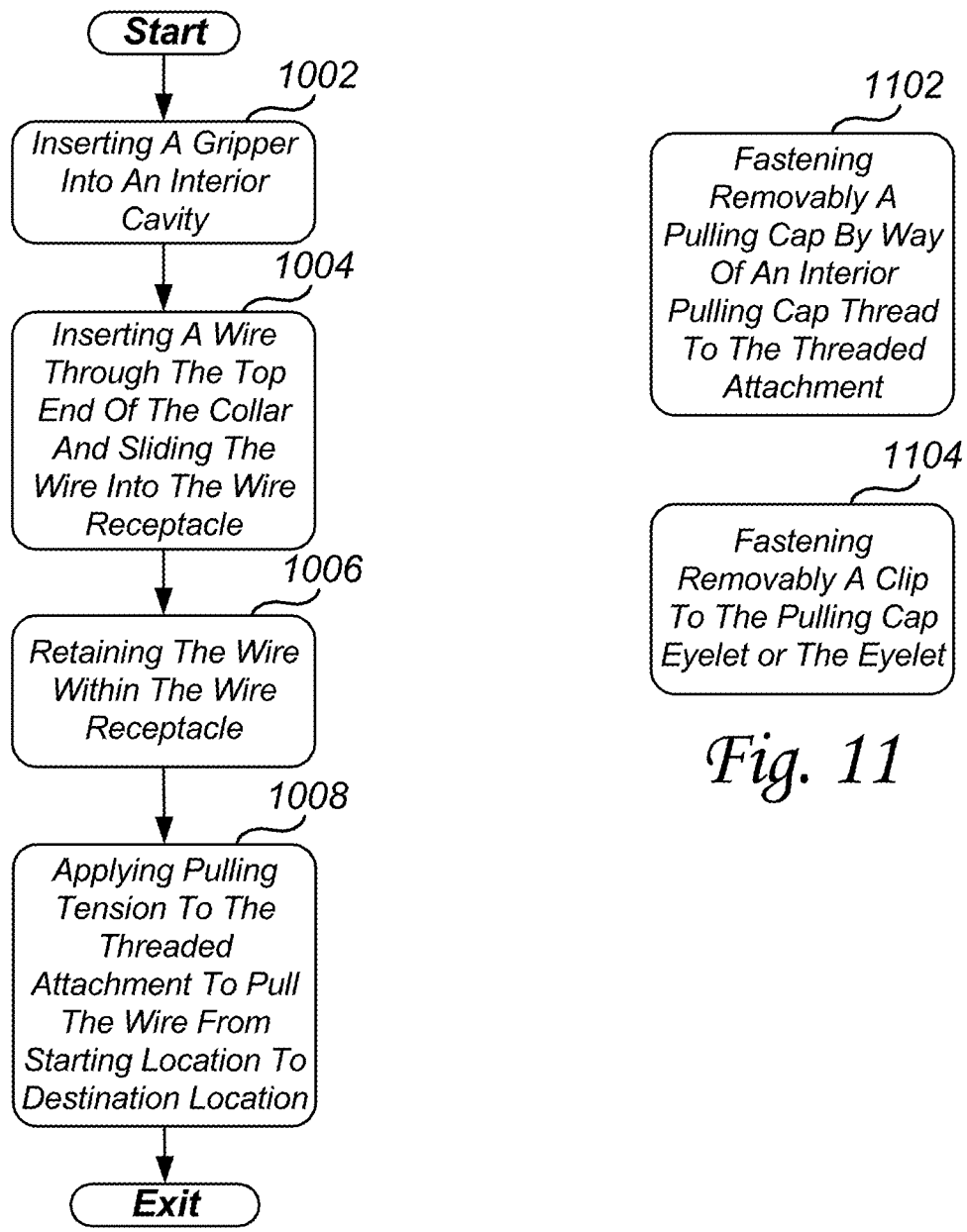
FIG. 10 illustrates one example of a method of using a wire grabber.
FIG. 11 illustrates examples of exemplary embodiments that can be interchangeably used with the methods of using a wire grabber.

FIG. 10 there is illustrated one example of a method of using a wire grabber. In an exemplary embodiment, the method begins in step 1002 where a gripper 120 is inserted into an interior cavity 102. A base 108 comprises an exterior base thread 104, the interior cavity 102, and a threaded attachment 112 or an eyelet 106. The gripper 120 comprises more than one flexible finger 132. The flexible finger 132 comprises an exterior contoured edge 156, and an interior finger surface 152 that forms a wire receptacle 154 between the flexible fingers 132. The gripper 120 slides into the interior cavity 102 of the base 108. A collar comprises a top end 140, a bottom end 138, a contoured interior wall 142 proximate to the top end 140, and an interior collar thread 160 proximate to the bottom end 138. The collar 118 is open at both the top end 140 and the bottom end 138. The method then moves to step 1004.

In step 1004, wire 202 is inserted through the top end 140 of the collar 118 and slid into the wire receptacle. The method then moves to step 1006.

In step 1006, the wire 202 is retained within the wire receptacle 154 by engaging the interior collar thread 160 with the exterior base thread 104 removably fastening the base 108 to the collar 118 causing the contoured interior wall 142 of the collar 118 to engage the exterior contoured edge 156 of the flexible finger 132 causing the flexible finger 132 to apply retaining pressure to the wire 202 preventing the wire 202 from being removed from the wire grabber 100. The method then moves to step 1008.

In step 1008, a pulling tension is applied to the threaded attachment 112 or the eyelet 106 to pull the wire 202 from a starting location to a destination location. Such pulling tension can be applied by way of a rod 204 that is screwed onto the threaded attachment 112 and pulled by an installer person often through walls, attics, ceilings, and other spaces.

In another exemplary embodiment, such pulling tension can also be applied by way of a pulling cap 134 that comprises a top pulling cap end 136 that is open, a bottom pulling cap end 164, an interior pulling cap thread 162 along the interior surface of the top pulling end 136, and a pulling cap eyelet 168 on the exterior surface of the pulling cap 134 proximate the bottom pulling cap end 164. The pulling cap thread 162 is removably fastened to the threaded attachment 112.

Referring to FIG. 11, there are illustrated examples of exemplary embodiments that can be interchangeably used with a method of using a wire grabber 100. In an exemplary embodiment, in step 1102, a pulling cap 134 can be removably fastened by way of an interior pulling cap thread 162 to the threaded attachment 112. The pulling cap 134 comprises a top pulling cap end 136 that is open, a bottom pulling cap end 164, the interior pulling cap thread 162 along the interior surface of the top pulling end 136, and a pulling cap eyelet 168 on the exterior surface proximate the bottom pulling cap end 164.

In step 1104, a clip 114 can be removably fastened to the pulling cap eyelet 168 or the eyelet 106.

An advantage in the present invention includes multiple wire sizes can be inserted into a tool and secured or otherwise held in place during wall fishing or any other type of pulling/running of the wire during common installations including but not limited to, pulling wire through walls, drop tile ceilings, attics, crawl spaces, stud bays, conduit or any other wire pulling activity.

While the preferred embodiment of the invention has been described, it will be understood that those skilled in the art, both now and in the future, may make various improvements and enhancements.

What is claimed is:

1. A wire grabber to aid in wire pulling comprising:
   a base comprises an exterior base thread, an interior cavity, and a threaded attachment;
   a gripper comprises more than one of a flexible finger, the flexible finger comprises an exterior contoured edge, and an interior finger surface that forms a wire receptacle between the flexible finger, the gripper slides into the interior cavity of the base;
   a collar comprises a top end, a bottom end, a contoured interior wall proximate to the top end, and an interior collar thread proximate to the bottom end, the collar is open at both the top end and the bottom end, a wire passes through the top end of the collar and slides into the wire receptacle, the interior collar thread engages the exterior base thread removably fastening the base to the collar causing the contoured interior wall to engage the exterior contoured edge of the flexible finger causing the flexible finger to apply retaining pressure to the wire preventing the wire from being removed from the wire grabber;
   a pulling cap comprises a top pulling cap end that is open, a bottom pulling cap end, and an interior pulling cap thread along interior surface of the top pulling end, and a pulling cap eyelet on exterior surface of the pulling cap proximate to the bottom pulling cap end, the pulling cap thread is removably fastened to the threaded attachment and a clip is removably connected to the pulling cap eyelet, the clip comprises a locking ring end, and a bent clip end, the locking ring end mates with the bent clip end increasing the amount of pulling tension force the clip supports;

wherein by applying pulling tension to the threaded attachment the wire is pulled from starting location to destination location.

2. The wire gripper in accordance with claim 1, the threaded attachment is positioned on the exterior surface of the base colinear with the wire receptacle, wherein when the wire is slid into the wire receptacle the threaded attachment is colinear with the wire.

3. The wire gripper in accordance with claim 1, the flexible finger comprises gripping teeth along the interior finger surface, wherein the gripping teeth engage the wire when the base is removably fastened to the collar minimizing slipping of the wire from the wire receptacle when pulling tension is applied to the wire.

4. The wire gripper in accordance with claim 1, the base comprises an exterior base finger grip, the exterior base finger grip is textured surface of raised ridges.

5. The wire gripper in accordance with claim 1, the collar comprises an exterior collar finger grip, the exterior collar finger grip is textured surface of raised ridges.

6. The wire gripper in accordance with claim 1, the base comprises an exterior base finger grip, the exterior base finger grip is a knurled textured surface.

7. The wire gripper in accordance with claim 1, the collar comprises an exterior collar finger grip, the exterior collar finger grip is a knurled textured surface.

8. A method of using a wire grabber to aid in wire pulling, the method comprising the steps of:

inserting a gripper into an interior cavity, a base comprises an exterior base thread, the interior cavity, and a threaded attachment, the gripper comprises more than one of a flexible finger, the flexible finger comprises an exterior contoured edge, and an interior finger surface that forms a wire receptacle between the flexible finger, the gripper slides into the interior cavity of the base, a collar comprises a top end, a bottom end, a contoured interior wall proximate to the top end, and an interior collar thread proximate to the bottom end, the collar is open at both the top end and the bottom end, a pulling cap comprises a top pulling cap end that is open, a bottom pulling cap end, and an interior pulling cap thread along interior surface of the top pulling end, and a pulling cap eyelet on exterior surface of the pulling cap proximate to the bottom pulling cap end, the pulling cap thread is removably fastened to the threaded attachment, and a clip is removably connected to the pulling cap eyelet, the clip comprises a locking ring end, and a bent clip end, the locking ring end mates with the bent clip end increasing the amount of pulling tension force the clip supports;

inserting a wire through the top end of the collar and slid into the wire receptacle;

retaining the wire within the wire receptacle by engaging the interior collar thread with the exterior base thread removably fastening the base to the collar causing the contoured interior wall of the collar to engage the exterior contoured edge of the flexible finger causing the flexible finger to apply retaining pressure to the wire preventing the wire from being removed from the wire grabber; and applying pulling tension to the threaded attachment or the eyelet to pull the wire from starting location to destination location.

9. A wire grabber to aid in wire pulling comprising:

a base comprises an exterior base thread, an interior cavity, and an eyelet;

a gripper comprises more than one of a flexible finger, the flexible finger comprises an exterior contoured edge, and an interior finger surface that forms a wire receptacle between the flexible finger, the gripper slides into the interior cavity of the base;

a collar comprises a top end, a bottom end, a contoured interior wall proximate to the top end, and an interior collar thread proximate to the bottom end, the collar is open at both the top end and the bottom end, a wire passes through the top end of the collar and slides into the wire receptacle, the interior collar thread engages the exterior base thread removably fastening the base to the collar causing the contoured interior wall to engage the exterior contoured edge of the flexible finger causing the flexible finger to apply retaining pressure to the wire preventing the wire from being removed from the wire grabber; and a clip is removably connected to the eyelet, the clip comprises a locking ring end, and a bent clip end, the locking ring end mates with the bent clip end increasing the amount of pulling tension force the clip supports;

wherein by applying pulling tension to the eyelet the wire is pulled from starting location to destination location.

10. The wire gripper in accordance with claim 9, the flexible finger comprises gripping teeth along the interior finger surface, wherein the gripping teeth engage the wire when the base is removably fastened to the collar minimizing slipping of the wire from the wire receptacle when pulling tension is applied to the wire.

11. The wire gripper in accordance with claim 9, the base comprises an exterior base finger grip, the exterior base finger grip is textured surface of raised ridges.

12. The wire gripper in accordance with claim 9, the collar comprises an exterior collar finger grip, the exterior collar finger grip is textured surface of raised ridges.

13. The wire gripper in accordance with claim 9, the base comprises an exterior base finger grip, the exterior base finger grip is a knurled textured surface, and the collar comprises an exterior collar finger grip, the exterior collar finger grip is a knurled textured surface.

* * * * *